United States Patent [19]

Ganley

[11] Patent Number: 5,320,152
[45] Date of Patent: Jun. 14, 1994

[54] UTILITY POLE RECYCLING PROCESS

[76] Inventor: James R. Ganley, 120 Fawn Dr., Clairton, Pa. 15025

[21] Appl. No.: 130,845

[22] Filed: Oct. 4, 1993

[51] Int. Cl.$^5$ ............................................. B27D 1/00
[52] U.S. Cl. .................... 144/352; 29/426.4; 52/730.7; 52/DIG. 9; 144/346; 144/3 R; 144/329; 144/369; 156/260; 156/264; 156/299
[58] Field of Search ............... 52/651.63, 730.7, 732.3, 52/785, DIG. 9; 156/260, 264, 265, 269, 299, 300, 301; 29/426.1, 426.4; 144/3 R, 329, 345, 348, 352, 364, 369, 373, 380, 330, 350; 428/106, 535, 537.1

[56] References Cited

U.S. PATENT DOCUMENTS

| | | |
|---|---|---|
| 2,824,342 | 2/1958 | Hoyle ................................. 52/730.7 |
| 3,041,231 | 6/1962 | Fountain ...................... 52/DIG. 9 X |
| 3,304,972 | 2/1967 | Kotesovec et al. . |
| 3,462,907 | 8/1969 | McKean ............................. 52/730.7 |
| 5,135,597 | 8/1992 | Barker ................................ 144/350 |
| 5,240,050 | 8/1993 | Shing .................................. 144/352 |

Primary Examiner—W. Donald Bray
Attorney, Agent, or Firm—Richard C. Litman

[57] ABSTRACT

Discarded utility poles may be recycles to form usable utility poles through a recycling process utilizing the good portions of the discarded utility pole to form pieces of lumber used in the construction of a composite beam. Discarded utility poles can be cut into pieces of lumber already treated with a wood preservative to be used form the laminated layers of a composite beam which may be used in the production of a new utility pole.

3 Claims, 2 Drawing Sheets

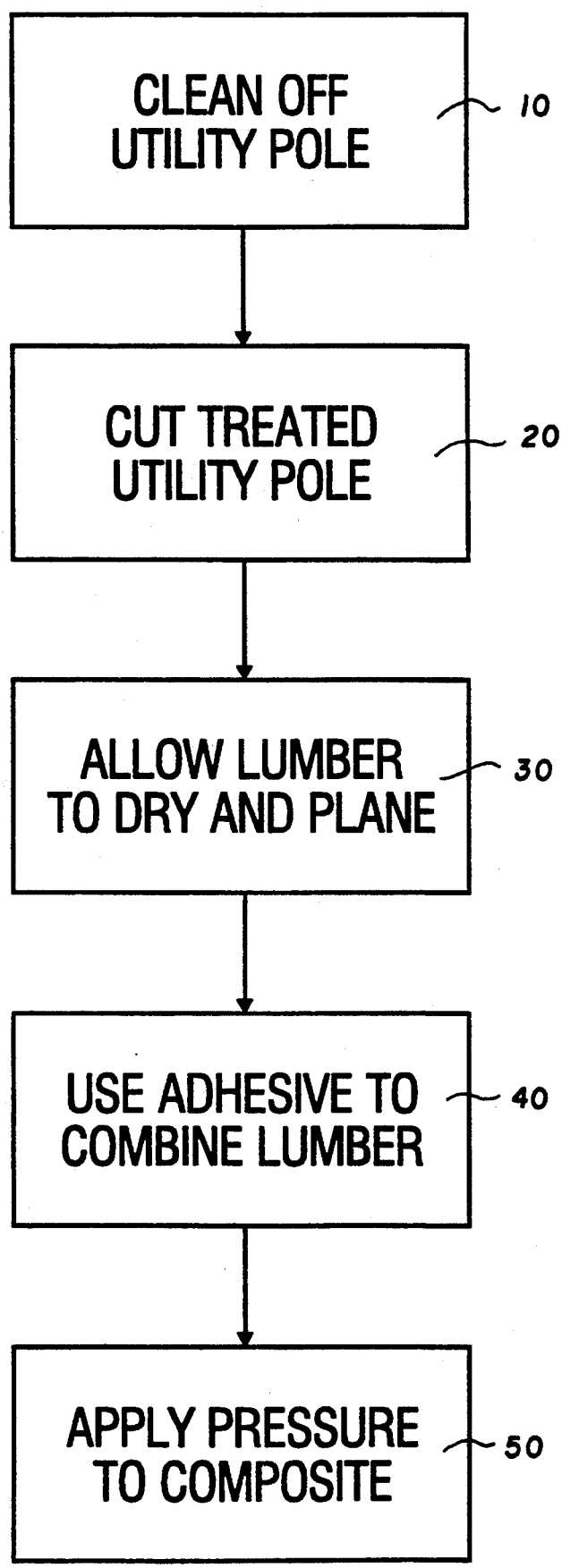

UTILITY POLE RECYCLING PROCESS

BACKGROUND OF THE INVENTION

1. Field of the Invention

The present invention relates to composite timber products. More particularly, the present invention relates to the recycling of used utility poles treated with creosote or pentachlorophenol by cleaning the boards, sawing the boards to form lumber of various sizes, and then gluing the boards together to form laminated beams.

2. Description of the Prior Art

U.S. Pat. No. 2,824,342 issued Feb. 25, 1958 to Robert J. Hoyle, Jr. discloses a telephone pole fabricated from a plurality of strip lamination of random length boards glued together in a predetermined assembled relation.

U.S. Pat. No. 3,041,231 issued Jun. 26, 1962 to Rex E. Fountain discloses a method of making laminated boards from rotten grade wood.

U.S. Pat. No. 3,304,972 issued Feb. 21, 1967 to Vladimir Kotesovec et al discloses a method and apparatus for rip sawing lumber by which a successive number of passes of saws is used to cut successively deeper kerfs in the lumber in order to obtain a wooden waste material in the form of relatively long chips to be used in the production of chipboard, fiberboard, cellulose, or the like.

U.S. Pat. No. 3,462,907 issued Aug. 26, 1969 to Herbert B. McKean discloses a curved laminated wood beams for use in the construction of telephone poles.

None of the above inventions and patents, taken either singly or in combination, is seen to describe the instant invention as claimed.

SUMMARY OF THE INVENTION

The present invention pertains to the recycling of discarded unusable utility poles to produce cross bars. Utility poles are generally formed of cut logs of trees such as southern yellow pine or cedar. The logs are first pressure treated with a wood preservative, most often creosote or pentachlorophenol. The pressurized treating process allows the creosote or pentachlorophenol to penetrate completely through the log, thus increasing the longevity of the utility pole formed therefrom. When it is determined that a utility pole is to be discarded, the utility pole is generally thrown away in a land fill. However, creosote and pentachlorophenol have recently been regarded as a contaminates, and landfills are refusing to take the discarded utility poles. Further, creosote is not being used in presently made utility poles.

In general, most of the wood of the discarded utility poles is still usable, since most of the interior portion of a discarded utility pole is still good wood. The advantage of the recycling of discarded utility poles is readily apparent after recognizing the potential for use of the good wood within the typical discarded utility pole. The recycling process of the present invention includes cutting the discarded utility pole to form pieces of lumber. Generally, the interior portion of the discarded utility pole is used to form such pieces. Afterwards, several pieces of lumber are glued together to form a composite structure which can be used as new cross bars for utility companies.

Accordingly, it is a principal object of the invention to provide a useful utility for discarded utility poles through the recycling method as set forth below.

It is another object of the invention to form a composite structure of cut lumber already treated with creosote or some other wood preservative.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 2 is a flowchart of the steps performed in accomplishing the recycling of the discarded utility poles.

Similar reference characters denote corresponding features consistently throughout the attached drawings.

DETAILED DESCRIPTION OF THE PREFERRED EMBODIMENT

Figure 1:
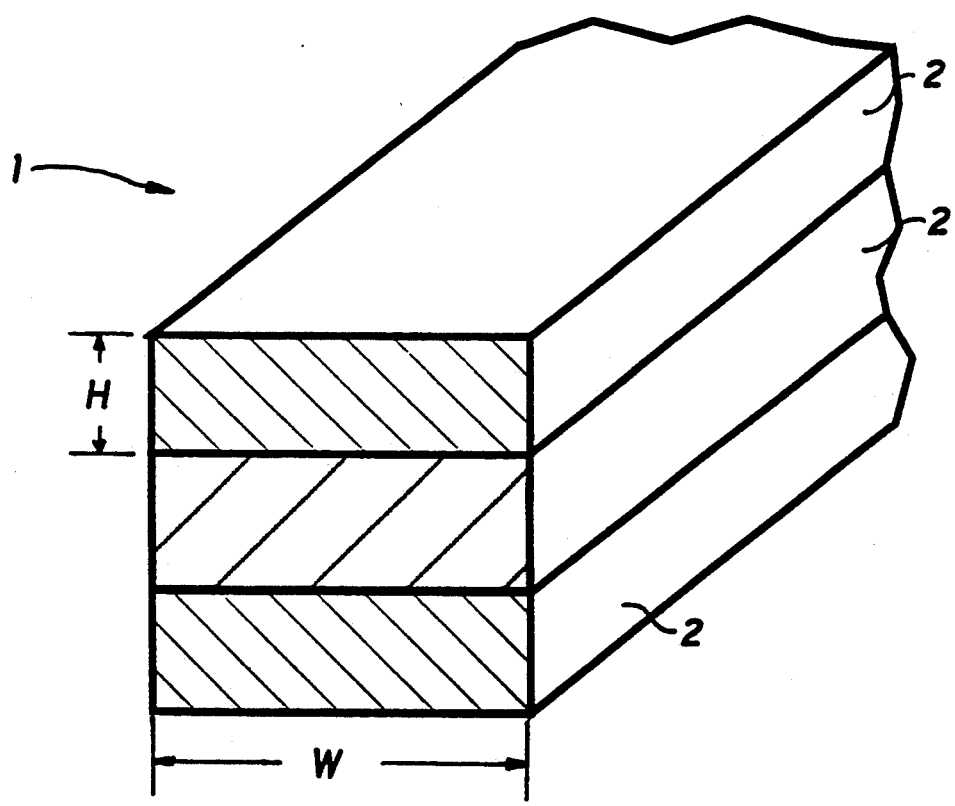
FIG. 1 is partial front perspective view of the finished product obtained using the recycling method of the present invention.

As illustrated in FIG. 1, the composite beam 1 produced by the recycling process of the present invention includes three or more layers of lumber 2, each one thereof cut from a discarded utility pole treated with a wood preservative, such as creosote or pentachlorophenol. In the preferred embodiment three pieces of lumber 2 are used to form the composite beam 1, the height H of each piece of cut lumber 2 is one and a half inches (1.5") or one and one-sixth inches (1.166"). If the height H is one and a half inches (1.5"), then the width of each piece of cut lumber 2 is preferably three and a half inches (3.5") so that the overall height of the composite beam 1 is four and a half inches (4.5") and the width is three and a half inches (3.5"). If the height H of each piece of lumber 2 is one and one-sixth inches (1.166"), then the width of each piece of cut lumber 2 is preferably four and a half inches (4.5") so that the overall height of the composite beam 1 is three and a half inches (3.5") and the width is (4.5"). In both cases, the dimensions of the composite beam 1 is three and a half inches (3.5") by four and a half inches (4.5"). This beam can then be used as a new cross bar.

Since generally only the outside portion of the utility pole and that portion which was buried rots, the interior portion of the discarded utility pole from which the pieces of lumber of the present invention are made, is still good wood. Furthermore, the utility poles used by the telephone industry, electric power supply industry, and the railroad industry are generally pressured treated with creosote or pentachlorophenol so that the chemical penetrates all portions of the utility pole. Therefore, the pieces of lumber forming the composite beam using the method of the present invention for recycling the discarded utility poles are already treated with a wood preservative and may not require additional preservative treatment.

As illustrated in FIG. 2, the first step 10 in the recycling process of the present invention is to manually clean off the utility pole from nails or other debris placed therein. Afterwards, the discarded utility pole is cut (see step 20). Parts of the utility pole not worth recycling can not be used to form the pieces of lumber 2 used in the composite structure 1. In general, it is the center portion of the discarded utility pole which is used to form the pieces of lumber 2. As stated above, each of the pieces of lumber 2 already contain the wood preservative applied to the discarded utility pole.

The cut lumber formed in step 20 is then allowed to dry, preferably in a temperature controlled room, for a predetermined period of time before it is planed to form the lumber 2 used to manufacture the composite beam 1 to form the new cross bar usable by a utility company (see step 20). After the lumber 2 is formed, three pieces of lumber 2 are combined as described above by placing an adhesive between the contacting pieces of lumber 2 and applying pressure thereto for a predetermined period of time. In the preferred embodiment, the composite is clamped for ten to twelve hours using a pressure of one-hundred and twenty-five pounds per square inch.

It is to be understood that the present invention is not limited to the sole embodiment described above, but encompasses any and all embodiments within the scope of the following claims.

I claim:

1. A recycling method for constructing composite structures of usable cross bars from discarded utility poles treated with a wood preservative, said recycling method comprising the steps of:

cleaning off one of said discarded utility poles, selectively treated with one of the wood preservatives creosote and pentachlorophenol;

cutting the treated utility pole into a plurality of lumber pieces after being cleaned off in the cleaning step;

planning each of the plurality of lumber pieces formed in said cutting step;

allowing the lumber pieces to dry for a first predetermined period of time after being planned in the planning step;

applying an adhesive between a predetermined number of the lumber pieces after allowing each one thereof to dry for said first predetermined period of time, thereby forming lamination; and applying pressure to the lamination for a second predetermined period of time before the adhesive applied therein dries so as to form said cross bar after said second predetermined period of time has elapsed with the pressure applied to lamination.

2. A recycling method for constructing composite structures of usable cross bars from discarded utility poles treated with a wood preservative, said recycling method comprising the steps of:

cleaning off one of said discarded utility poles treated with a wood preservative.

cutting the treated utility pole into a plurality of lumber pieces after being cleaned off in the cleaning step;

planning each of the plurality of lumber pieces formed in said cutting step;

allowing the lumber pieces to dry for a first predetermined period of time after being planned in the planning step;

applying an adhesive between a predetermined number of the lumber pieces after allowing each one thereof to dry for said first predetermined period of time, thereby forming lamination; and applying pressure to the lamination for a second predetermined period of time before the adhesive applied therein dries so as to form said cross bar after said second predetermined period of time has elapsed with the pressure applied to lamination.

3. A recycling method comprising the steps of:

cutting wood already treated with a wood preservative into a plurality of lumber pieces;

planning each of the plurality of lumber pieces formed in said cutting step;

allowing the lumber pieces to dry for a first predetermined period of time after being planned in the planning step;

applying an adhesive between a predetermined number of the lumber pieces after allowing each one thereof to dry for said first predetermined period of time; and applying pressure for a second predetermined period of time to the lumber pieces having the adhesive applied therebetween.

* * * * *